United States Patent Office 2,834,767
Patented May 13, 1958

2,834,767
COPOLYMERS AND METHOD OF PREPARATION THEREOF

John M. Hoyt, Woodside, N. Y., assignor, by mesne assignments, to Minnesota Mining and Manufacturing Company, St. Paul, Minn., a corporation of Delaware No Drawing. Application January 26, 1955
Serial No. 484,317

10 Claims. (Cl. 260—87.5)

This invention relates to novel copolymers of halogenated ethylenes with vinyl ethers.

In accordance with the present invention, copolymers of halogenated ethylenes and vinyl alkyl ethers are produced which have many valuable properties; some of these copolymers are rubbery at room temperature, while others are tough plastic materials. The tough plastic copolymers are of value in producing films, coatings, adhesives, and shaped plastic articles. Coatings of these copolymers exhibit good adhesion to metals. Besides being of use in some of the foregoing applications, the rubbery copolymers possess added utility as substitutes for natural rubber in applications which require good resistance to aliphatic and aromatic hydrocarbons.

The halogenated ethylenes which are preferably used in the process of the invention to produce the desired copolymers have the formula

in which X is fluorine or chlorine and $X_1$ is hydrogen, fluorine, or chlorine. Exemplary of the halogenated ethylenes which may be used are chlorotrifluoroethylene, perfluoroethylene, 1,1-dichloro-2,2-difluoroethylene, trifluoroethylene, and 1-chloro-2,2-difluoroethylene.

The vinyl alkyl ethers which may be polymerized with the halogenated ethylenes to produce the copolymers of the invention are those having from 1 to 8 carbon atoms in the alkyl group. Exemplary of such compounds are vinyl methyl ether, vinyl ethyl ether, vinyl n-propyl ether, vinyl isopropyl ether, vinyl n-butyl ether, vinyl isobutyl ether, vinyl t-butyl ether, vinyl 2-ethylhexyl ether, and vinyl 2-chloroethyl ether. In addition to halogen, the alkyl group may be substituted with alkoxy groups, as in vinyl 2-methoxy ethyl ether and vinyl 2-butoxy ethyl ether.

The copolymers of the invention may be prepared in various comonomer ratios using any of the conventional alkaline emulsion or mass polymerization recipes. Since acid media tend to promote the hydrolysis of the vinyl ethers, acid emulsion and suspension systems are not suitable for use in the copolymerization reactions of the invention. The pH of the system should be no lower than 6, and preferably is 7 or above. The temperature employed in the copolymerization reaction may be between about —30° C. and 150° C. Where an aqueous system is used, the temperature will be in the range of about 0° C. to 100° C.

For example, as emulsion catalyst system, containing water, soap, and a peroxy compound, may be used. The different types of emulsion systems may be conveniently differentiated on the basis of the catalyst system employed to initiate the polymerization. One type is that in which the polymerization is initiated by employing a redox catalyst system, comprising between about 0.01 to about 1 part by weight per 100 parts of total comonomers present, of an organic oxidant and an activator solution. Exemplary of the organic oxidants which may be used in the emulsion catalyst system are cumene hydroperoxide, diisopropylbenzene hydroperoxide, triisopropylbenzene hydroperoxide, methylcyclohexane hydroperoxide, tertiary-butyl perbenzoate, and tertiary-butyl hydroperoxide. A typical activator solution may consist of about 0.01 to 1.0 part by weight per 100 parts of total comonomers present of a variable valance metal salt, for example ferrous sulfate, about 0.1 to 10.0 parts by weight of sodium pyrophosphate, and about 0.1 to 10.0 parts by weight of a reducing sugar, such as dextrose, fructose, or levulose.

Another type of emulsion catalyst system is that which comprises about 0.05 to 5 parts by weight per 100 parts of total comonomers present of a persulfate as the oxidant, and which preferably comprises between about 0.1 and about 0.5 part by weight of an inorganic persulfate, such as potassium persulfate, sodium persulfate, or ammonium persulfate.

The soap employed as the emulsifying agent in either the redox or persulfate emulsion catalyst systems is preferably a metal salt, such as the potassium or sodium salt, derived from saturated aliphatic acids, the optimum chain length of the acid being between about 14 and about 20 carbon atoms, or from polyfluorocarboxylic acids or perfluorochlorocarboxylic acids. The polyfluorocarboxylic acid salts which may be used are those disclosed in U. S. Patent No. 2,559,752, and the non-acidic derivatives of the acids disclosed therein as being efficacious dispersing agents in polymerization reactions may also be used in the process of the present invention. The perfluorochlorocarboxylic acid salts which may be used in the process of the present invention are those disclosed in copending application Serial No. 463,073, filed October 18, 1954, as being useful as dispersing agents in polymerization reactions. The soap is generally present in a quantity between about 0.5 and about 10 parts by weight per 100 parts of total comonomers present. The emulsion polymerization is conducted under alkaline conditions, and the pH should be maintained between about 9 and 11 in order to prevent gelling of the soap. The pH may be adjusted, if desired, by the addition of suitable buffers.

As indicated above, the copolymerization reaction also may be carried out under the aforementioned temperature conditions, with a temperature between about —20° C. and 60° C. being preferred, in a mass or bulk polymerization system employing an organic peroxide promoter. Of these promoters, substituted acetyl peroxides are preferably used in carrying out the copolymerization in the temperature range from about —30° to about 30° C. Trichloroacetyl peroxide is the preferred promoter of this type. Other halogen-substituted organic peroxides which are suitable for carrying out the copolymerization in a mass copolymerization system in the temperature range from about —30° to about 30° C. are trifluoroacetyl peroxide, difluoroacetyl peroxide, 2,4-dichlorobenzoyl peroxide, chloroacetyl peroxide and perfluoropropionyl peroxide. In the temperature range from about 30° C. to 150° C., the copolymerization reaction may be carried out in a mass or bulk copolymerization system employing organic peroxides such as acetyl peroxide, benzoyl peroxide, lauroyl peroxide or t-butyl peroxide; in the upper portion of this temperature range, t-butyl peroxide is preferred.

The copolymers of this invention may be prepared at pressure ranging from atmospheric pressure to 1200 p. s. i. g. As a matter of convenience, the copolymers are prepared under autogenous conditions of pressure, i. e., about 50 to 700 p. s. i. g. The reaction time may be between about 0.1 hour and 100 hours, preferably about 5 to 75 hours.

Polymerization modifiers may also be employed to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Chloroform is the preferred modifier.

The invention will be further illustrated by reference to the following specific examples in which all parts are by weight:

EXAMPLE 1

*Copolymers of chlorotrifluoroethylene and vinyl 2-chloroethyl ether*

The following alkaline emulsion polymerization catalyst system was employed in carrying out the polymerization reaction:

| | Parts by weight |
|---|---|
| Water, deionized | 180.0 |
| Total monomers | 100.0 |
| Soap | 5.0 |
| Potassium persulfate | 0.3 |
| Buffer solution (pH 10) | 20.0 |

After flushing a heavy walled polymerization tube with nitrogen, the tube was charged with 180 parts of buffered potassium fatty acid soap solution having a pH of 10. This soap solution was obtained by dissolving 5.0 parts of soap in 160 parts of deionized water, adjusting the pH to 10.0 with a 5 percent solution of potassium hydroxide followed by the addition of 20 parts of a concentrated standard buffer solution providing a pH of 10.0. The polymerization tube was then placed in a solid carbon dioxide-trichloroethylene bath. When the contents of the tube were frozen solid, 20 parts of an aqueous solution containing 0.3 part of potassium persulfate were added, and the contents of the tube were refrozen. There were then added 23.4 parts of freshly distilled and purified vinyl 2-chloroethyl ether. After the contents of the tube were refrozen, the tube was connected to a gas transfer system, frozen further with liquid nitrogen, and evacuated. Thereafter, 76.6 parts of chlorotrifluoroethylene were flash distilled into the tube to make up a total monomer charge containing 25 mole percent of the vinyl ether and 75 mole percent of chlorotrifluoroethylene. The tube was then sealed and rotated end-over-end in a water bath set at a temperature of 50° C. for a period of 4.3 hours under autogenous pressure. The contents of the tube were then frozen in a solid carbon dioxide-trichloroethylene bath to coagulate the polymer latex. Excess vinyl 2-chloroethyl ether was removed with steam. The coagulated product was collected, washed well with hot water, and dried in vacuo at a temperature of 35° C. The product was a tough inelastic resinous solid and was obtained in a 45 percent conversion based on the total monomers charged. Analysis for chlorine and fluorine content showed the product to contain 56 mole percent of combined chlorotrifluoroethylene and 44 mole percent of vinyl 2-chloroethyl ether.

The above procedure was repeated except that 47.8 parts of vinyl 2-chloroethyl ether and 52.2 parts of chlorotrifluoroethylene were used, representing a total monomer charge containing 50 mole percent of each monomer. The polymerization was conducted for 2.7 hours at 50° C. under autogenous pressure and the product was worked up as set forth above. A tough inelastic resinous solid product was obtained in 71 percent conversion. Analysis for fluorine and chlorine content showed it to contain 52 mole percent of combined chlorotrifluoroethylene and 48 mole percent of combined vinyl 2-chloroethyl ether. This product had a 0.5 percent solution viscosity value, in dichlorobenzotrifluoride solvent at 266° F., of 0.659 centistoke.

A clear, flexible, and tough sheet was obtained by pre-pressing the above copolymer products of chlorotrifluoroethylene and vinyl 2-chloroethyl ether at 12,000 p. s. i. and at a temperature of 300° F. between steel plates covered with aluminum foil. The pressed copolymer sheets could be cold drawn.

EXAMPLE 2

*Copolymers of chlorotrifluoroethylene and vinyl ethyl ether*

A polymerization tube was charged with the same buffered soap solution in the same manner described above in Example 1. Thereafter, the tube was charged with 38.2 parts of freshly distilled and purified vinyl ethyl ether and 61.8 parts of chlorotrifluoroethylene corresponding to a total monomer charge containing 50 mole percent of each monomer. The polymerization reaction was conducted for 2 hours under autogenous pressure at a temperature of 50° C. The polymer latex was coagulated by freezing. The coagulated product was freed of excess vinyl ethyl ether with steam, washed well with hot water and dried in vacuo to constant weight at a temperature of 35° C. The product was a tough and very slightly rubbery solid and was obtained in an 89 percent conversion, based upon the total monomers charged. Analysis for chlorine and fluorine content showed the product to contain 51 mole percent of combined chlorotrifluoroethylene and 49 mole percent of combined vinyl ethyl ether.

The above procedure was repeated except that 17.0 parts of vinyl ethyl ether and 83.0 parts of chlorotrifluoroethylene were used corresponding to a total monomer charge containing 25 mole percent of vinyl ethyl ether and 75 mole percent of chlorotrifluoroethylene. The polymerization was conducted for 22 hours under autogenous pressure at a temperature of 50° C., and the product was worked up as set forth above. A hard inelastic resinous product was obtained in a 50 percent conversion. Analysis for fluorine and chlorine content showed the product to contain 56 mole percent of combined chlorotrifluoroethylene and 46 mole percent of combined vinyl ethyl ether. This product had a 0.5 percent solution viscosity value, in dichlorobenzotrifluoride solvent, at 266° F., of 0.579 centistoke.

A clear, flexible, and tough film was obtained by pre-pressing each of the above copolymer products of chlorotrifluoroethylene and vinyl ethyl ether at 12,000 p. s. i. and at a temperature of 300° F. between steel plates covered with aluminum foil; these films could be cold drawn.

EXAMPLE 3

*Copolymers of chlorotrifluoroethylene and vinyl isobutyl ether*

The same general recipe of Example 1 above was employed except that 4.5 parts of soap and 16.4 parts of the standard buffer solution were used instead of 5.0 parts and 20 parts, respectively. After charging a glass polymerization tube with the buffered soap and potassium persulfate solutions in the manner described in Example 1 above, the tube was further charged with 72 parts of vinyl isobutyl ether and 28 parts of chlorotrifluoroethylene, corresponding to a total monomer charge containing 75 mole percent of the vinyl ether and 25 mole percent of chlorotrifluoroethylene. The polymerization was conducted for 1.3 hours under autogenous pressure at a temperature of 50° C. and the product was coagulated, collected, washed, and dried as described in Example 2 above. A hard and very slightly rubbery resinous products was obtained in 52 percent conversion and chlorine and fluorine analysis showed the product to contain 52 mole percent of combined chlorotrifluoroethylene and 48 mole percent of combined vinyl isobutyl ether.

The above procedure was repeated except that 46.2 parts of vinyl isobutyl ether and 53.8 parts of chlorotrifluoroethylene were used, corresponding to a total monomer charge containing 50 mole percent of each monomer. The polymerization was conducted for 1.3 hours under autogenous pressure at a temperature of 50° C. to obtain a 78 percent conversion of total monomers charged to polymeric product. The product was a hard, very slightly rubbery resinous material and was shown upon analysis for chlorine and fluorine content to contain 53 mole percent of combined chlorotrifluoroethylene and 47 mole percent of combined vinyl isobutyl ether.

The above procedure was again repeated except that 22.2 parts of vinyl isobutyl ether and 77.8 parts of chlorotrifluoroethylene were used, corresponding to a total monomer charge containing 25 mole percent of the vinyl ether and 75 mole percent of chlorotrifluoroethylene. The polymerization was conducted for 1.3 hours under autogenous pressure at a temperature of 50° C. to obtain a 37 percent conversion of total monomers charged to polymeric product. The product was a hard, very slightly rubbery resinous material and was shown upon analysis for chlorine and fluorine content to contain 55 mole percent of combined chlorotrifluoroethylene and 45 mole percent of combined vinyl isobutyl ether.

A clear, flexible and tough film, which could be cold drawn, was obtained from each of the above copolymer products of chlorotrifluoroethylene and vinyl isobutyl ether by prepressing each of the samples at 12,000 p. s. i. at a temperature of 300° F. between steel plates covered with aluminum foil.

EXAMPLE 4

*Copolymer of perfluoroethylene and vinyl 2-chloroethyl ether*

The following alkaline emulsion polymerization catalyst system was employed in carrying out the polymerization reaction:

|  | Parts by weight |
|---|---|
| Water, deionized | 180.0 |
| Total monomers | 100.0 |
| Soap | 5.0 |
| Potassium persulfate | 0.3 |
| Buffer solution (pH 10) | 20.0 |

After flushing a heavy walled polymerization tube with nitrogen, the tube was charged with 180 parts of buffered potassium fatty acid soap solution having a pH of 10. This soap solution was obtained by dissolving 5.0 parts of soap in 160 parts of deionized water, adjusting the pH to 10.0 with a 5 percent solution of potassium hydroxide followed by the addition of 20 parts of a concentrated standard buffer solution providing a pH of 10.0. The polymerization tube was then placed in a solid carbon dioxide-trichloroethylene bath. When the contents of the tube were frozen solid, 20 parts of an aqueous solution containing 0.3 part of potassium persulfate were added and the contents of the tube were refrozen. There were then added 51.4 parts of freshly distilled and purified vinyl 2-chloroethyl ether. After the contents of the tube were refrozen, the tube was connected to a gas transfer system, further frozen with liquid nitrogen and evacuated. Thereafter, 48.6 parts of perfluoroethylene were flash distilled into the tube to make up a total monomer charge containing 50 mole percent of each monomer. The tube was sealed and rotated end-over-end in a water bath set at a temperature of 50° C. for a period of 2 hours under autogenous pressure. The contents of the tube were then frozen in a solid carbon dioxide-trichloroethylene bath to coagulate the polymer latex. Excess vinyl 2-chloroethyl ether was removed with steam. The coagulated product was collected, washed well with hot water, and dried in vacuo at a temperature of 35° C. The product was a rubber and was obtained in a 39 percent conversion, based on the total monomers charged. Analysis for chlorine and fluorine content showed the product to contain 49 mole percent of perfluoroethylene and 51 mole percent of vinyl 2-chloroethyl ether. Upon molding a sample of the raw copolymer product at a temperature of 300° F., a firm and flexible polymer sheet was obtained.

EXAMPLE 5

*Copolymer of perfluoroethylene and vinyl ethyl ether*

A polymerization tube was charged with the same buffered soap solution and in the same manner described above in Example 4. Thereafter, the tube was charged with 42.0 parts of purified vinyl ethyl ether and 58.0 parts of perfluoroethylene corresponding to a total monomer charge containing 50 mole percent of each monomer. The polymerization reaction was conducted for 4 hours under autogenous pressure at a temperature of 50° C. The polymer latex was coagulated by freezing. The coagulated product was collected, washed well with hot water, and dried in vacuo to constant weight at a temperature of 35° C. The product was a very elastic rubber and was obtained in a 41 percent conversion, based upon the total monomers charged. Analysis for fluorine content showed the product to contain 48 mole percent of combined perfluoroethylene and 52 mole percent of combined vinyl ethyl ether. A strong, elastic film was obtained when this copolymer product was pressed at 12,000 p. s. i. and 300° F. between steel plates covered with aluminum foil.

EXAMPLE 6

*Copolymer of perfluroethylene and vinyl isobutyl ether*

The same general recipe of Example 4 above was employed except that 4.5 parts of soap and 16.4 parts of the standard buffer solution were used instead of 5.0 parts and 20 parts, respectively. After charging a glass polymerization tube with the buffered soap and potassium persulfate solutions in the manner described in Example 4 above, the tube was further charged with 50 parts of vinyl isobutyl ether and 50 parts of perfluoroethylene, corresponding to a total monomer charge containing 50 mole percent of each monomer. The polymerization was conducted for 1.3 hours under autogenous pressure at a temperature of 50° C., and the product was coagulated, collected, washed and dried as described in Example 5 above. The product was a very elastic rubber and was obtained in a 41 percent conversion, based on the total monomers charged. Fluorine analysis showed the product to contain 52 mole percent of combined perfluoroethylene and 48 mole percent of combined vinyl isobutyl ether. An elastic film was obtained when this copolymer product was pressed at 12,000 p. s. i. and 300° F. between steel plates covered with aluminum foil.

EXAMPLE 7

*Copolymers of 1,1-dichloro-2,2-difluoroethylene and vinyl 2-chloroethyl ether*

The following alkaline emulsion polymerization catalyst system was employed in carrying out the polymerization reaction:

|  | Parts by weight |
|---|---|
| Water, deionized | 180.0 |
| Total monomers | 100.0 |
| Soap | 5.0 |
| Potassium persulfate | 0.3 |
| Buffer solution (pH 10) | 20.0 |

After flushing a heavy walled polymerization tube with nitrogen, the tube was charged with 180 parts of buffered potassium fatty acid soap solution having a pH of 10. This soap solution was obtained by dissolving 5.0 parts of soap in 160 parts of deionized water, adjusting the pH to 10.0 with a 5 percent solution of potassium hydroxide followed by the addition of 20 parts of a concentrated standard buffer solution providing a pH of 10.0. The polymerization tube was then placed in a solid carbon dioxide-trichloroethylene bath. When the contents of the tube were frozen solid, 20 parts of an aqueous solution containing 0.3 part of potassium persulfate were added and the contents of the tube were refrozen. There were then added 44.6 parts of freshly distilled and purified vinyl 2-chloroethyl ether. After the contents of the tube were refrozen, the tube was connected to a gas transfer system, further frozen with liquid nitrogen, and evacuated. Thereafter, 55.4 parts of chlorotrifluoroethylene were flash distilled into the tube to make up a total monomer charge containing 50 mole percent of each monomer. The tube was sealed and rotated end-over-end in a water bath set at a temperature of 50° C. for a period of 5.0 hours under autogenous pressure. The contents of the tube were then frozen in a solid carbon dioxide-trichloroethylene bath to coagulate the polymer product. Excess vinyl 2-chloroethyl ether was removed with steam. The coagulated product was collected, washed well with hot water, and dried in vacuo at a temperature of 35° C. The product was a resinous solid and was obtained in a 23 percent conversion, based on the amount of total monomers charged. Analysis for chlorine and fluorine content showed the product to contain 55 mole percent of combined 1,1-dichloro-2,2-difluoroethylene and 45 mole percent of vinyl 2-chloroethyl ether.

EXAMPLE 8

*Copolymer of 1,1-dichloro-2,2-difluoroethylene and vinyl ethyl ether*

A polymerization tube was charged with the same buffered soap solution and in the same manner described above in Example 7. Thereafter, the tube was charged with 35.2 parts of freshly distilled and purified vinyl ethyl ether and 64.8 parts of 1,1-dichloro-2,2-difluoroethylene, corresponding to a total monomer charge containing 50 mole percent of each monomer. The polymerization reaction was conducted for 2 hours under autogenous pressure at a temperature of 50° C. The polymer latex was coagulated by freezing. The coagulated product was collected, washed well with hot water, and dried in vacuo to constant weight at a temperature of 35° C. The product was a resinous solid and was obtained in 32 percent conversion, based upon the total monomers charged. Analysis for chlorine and fluorine content showed the product to contain 62 mole percent of combined 1,1-dichloro-2,2-difluoroethylene and 38 mole percent of combined vinyl ethyl ether.

EXAMPLE 9

*Copolymer of 1,1-dichloro-2,2-difluoroethylene and vinyl isobutyl ether*

The same general recipe of Example 7 above was employed except that 4.5 parts of soap and 16.4 parts of the standard buffer solution were used instead of 5.0 parts and 20 parts, respectively. After charging a glass polymerization tube with the buffered soap and potassium persulfate solutions in the manner described in Example 7 above, the tube was further charged with 41.0 parts of vinyl isobutyl ether and 59.0 parts of 1,1-dichloro-2,2-difluoroethylene, corresponding to a total monomer charge containing 52 mole percent of 1,1-dichloro-2,2-difluoroethylene and 48 mole percent of the vinyl ether. The polymerization was conducted for 1.3 hours under autogenous pressure at a temperature of 50° C. and the product was coagulated, collected, washed, and dried as described in Example 8 above. A hard and very slightly rubbery resinous product was obtained in 9 percent conversion, and chlorine and fluorine analysis showed the product to contain 44 mole percent of combined 1,1-dichloro-2,2-difluoroethylene and 56 mole percent of combined vinyl isobutyl ether.

It will be obvious to those skilled in the art that many modifications may be made within the scope of the present invention without departing from the spirit thereof, and the invention includes all such modifications.

I claim:

1. A copolymer of vinyl 2-chloroethyl ether and 1,1-dichloro-2,2-difluoroethylene as the remaining major monomeric constituent.

2. A copolymer of vinyl ethyl ether and 1,1-dichloro-2,2-difluoroethylene as the remaining major monomeric constituent.

3. A copolymer of vinyl isobutyl ether and 1,1-dichloro-2,2-difluoroethylene as the remaining major monomeric constituent.

4. A process which comprises copolymerizing a monomeric mixture of vinyl 2-chloroethyl ether and 1,1-dichloro-2,2-difluoroethylene as the remaining major monomeric component of said monomer mixture, at a temperature between about −30° C. and about 150° C.

5. A process which comprises copolymerizing a monomeric mixture of vinyl ethyl ether and 1,1-dichloro-2,2-difluoroethylene as the remaining major monomeric component of said monomer mixture, at a temperature between about −30° C. and about 150° C.

6. A process which comprises copolymerizing a monomeric mixture of vinyl isobutyl ether and 1,1-dichloro-2,2-difluoroethylene as the remaining major monomeric component of said monomer mixture, at a temperature between about −30° C. and about 150° C.

7. A copolymer of a vinyl alkyl ether having one to eight carbon atoms in the alkyl group and in which said alkyl group is selected from the group consisting of an unsubstituted alkyl radical, a chloroalkyl radical and an alkoxy-substituted alkyl radical, and dichlorodifluoroethylene as the remaining major monomeric constituent.

8. A copolymer of a vinyl alkyl ether having one to eight carbon atoms in the alkyl group and in which said alkyl group is selected from the group consisting of an unsubstituted alkyl radical, a chloroalkyl radical and an alkoxy-substituted alkyl radical, and 1,1-dichloro-2,2-difluoroethylene as the remaining major monomeric constituent.

9. A process which comprises copolymerizing a monomeric mixture of a vinyl alkyl ether having one to eight carbon atoms in the alkyl group and in which said alkyl group is selected from the group consisting of an unsubstituted alkyl radical, a chloroalkyl radical and an alkoxy-substituted alkyl radical, and dichlorodifluoroethylene as the remaining major monomeric component of said monomeric mixture at a temperature between about −30° C. and about 150° C.

10. A process which comprises copolymerizing a monomeric mixture of a vinyl alkyl ether having one to eight carbon atoms in the alkyl group and in which said alkyl group is selected from the group consisting of an unsubstituted alkyl radical, a chloroalkyl radical, and an alkoxy-substituted alkyl radical, and 1,1-dichloro-2,2-difluoroethylene as the remaining major monomeric component of said monomeric mixture, at a temperature between about −30° C. and about 150° C.

References Cited in the file of this patent

UNITED STATES PATENTS

| | | |
|---|---|---|
| 2,066,330 | Carothers et al. | Jan. 5, 1937 |
| 2,468,664 | Hanford et al. | Apr. 26, 1949 |
| 2,479,367 | Joyce et al. | Aug. 16, 1949 |
| 2,559,752 | Berry | July 10, 1951 |